United States Patent [19]

Hopely, Jr.

[11] Patent Number: 4,947,955
[45] Date of Patent: Aug. 14, 1990

[54] PERSONAL VEHICLE HAVING A TAKE-APART FRAME

[75] Inventor: Robert C. Hopely, Jr., Gibbstown, N.J.

[73] Assignee: Electric Mobility Corp., Sewell, N.J.

[21] Appl. No.: 296,805

[22] Filed: Jan. 13, 1989

[51] Int. Cl.⁵ .............................................. B62D 61/08
[52] U.S. Cl. ..................................... 180/216; 180/208; 180/65.1; 180/907
[58] Field of Search ......................... 180/11, 12, 13, 15, 180/208, 216, 907, 16, 65.1; 280/287, 460.1

[56] References Cited

U.S. PATENT DOCUMENTS

| | | | |
|---|---|---|---|
| 2,636,568 | 4/1953 | Rutishauser | 180/12 X |
| 3,106,412 | 10/1963 | Liljenberg | 280/287 |
| 3,912,032 | 10/1975 | Benz et al. | 180/13 |
| 4,037,678 | 7/1977 | Braune | 180/11 |
| 4,168,846 | 9/1979 | Carren | 280/287 X |
| 4,452,327 | 6/1984 | Mowat et al. | 180/11 |
| 4,570,739 | 2/1986 | Kramer | 180/65.1 X |
| 4,666,008 | 5/1987 | Shepard et al. | 180/907 X |
| 4,750,578 | 6/1988 | Brandenfels | 180/13 |
| 4,757,868 | 7/1988 | Cresswell | 180/13 X |

FOREIGN PATENT DOCUMENTS 1030322  5/1966  United Kingdom ................. 180/12

Primary Examiner—Charles A. Marmor
Assistant Examiner—Brian L. Johnson
Attorney, Agent, or Firm—Edmund M. Jaskiewicz

[57] ABSTRACT

A personal mobility vehicle comprises front and rear frame sections which can be disassembled and assembled. The frame sections are secured together by a pivotable detachable connection such that the rear frame section is lockingly received in the rear portion of the front frame section and the length of the assembled frame is substantially the same as the length of the front frame section itself.

15 Claims, 2 Drawing Sheets

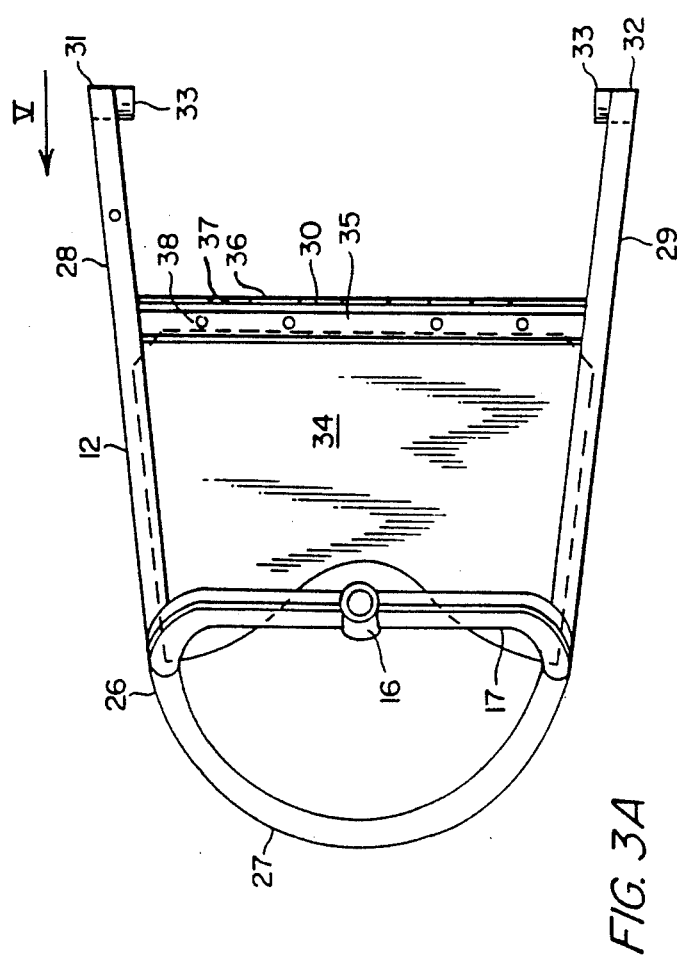
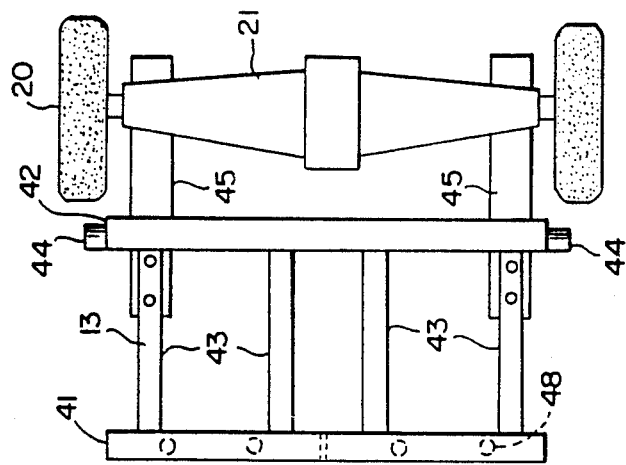
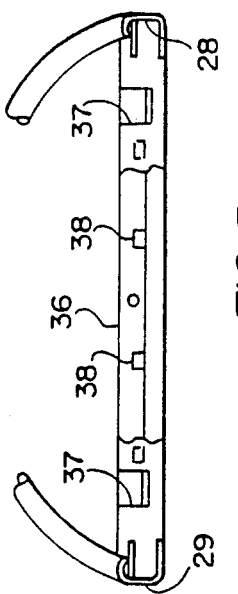
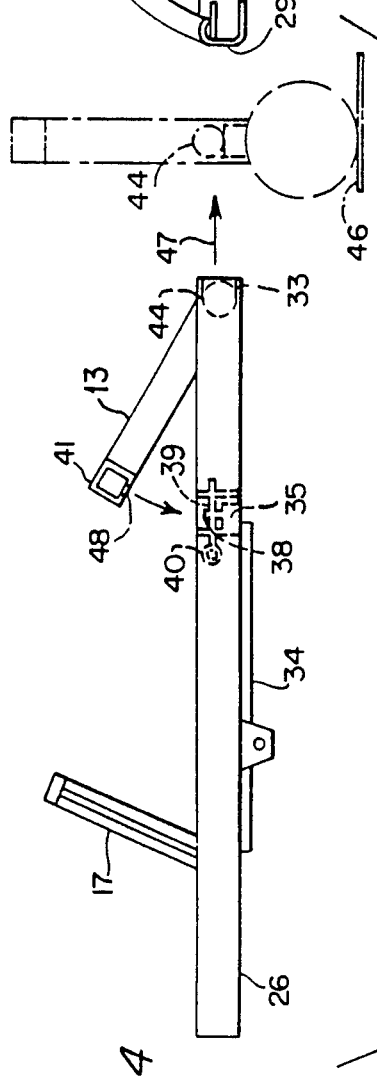
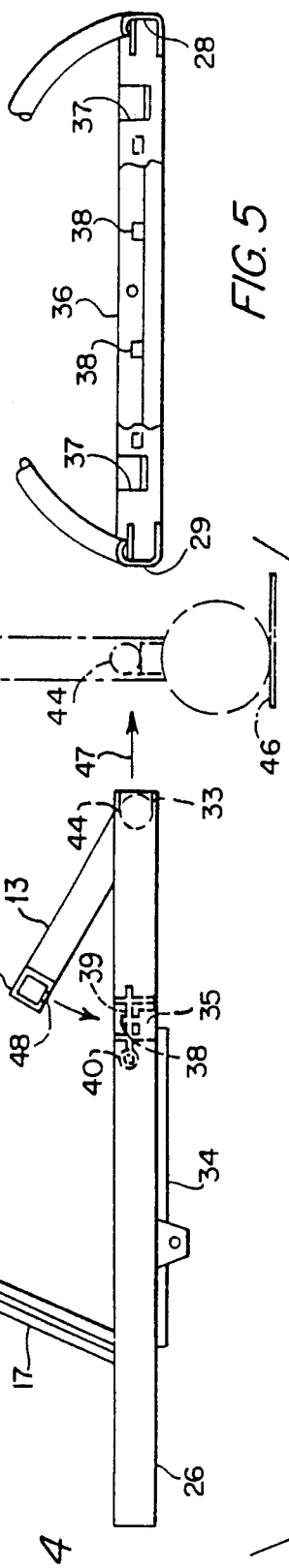

PERSONAL VEHICLE HAVING A TAKE-APART FRAME

The present invention relates to self-propelled personal vehicles intended for persons who have some physical disability and which have a separable power unit and a control unit, more particularly, to a detachable connection between the power and control units.

In order to provide persons with partial or total walking disabilities with an increased range and greater flexibility in locomotion, small personal mobility vehicles have been developed. One form of such vehicle generally has a pair of rear wheels which are powered by an electric storage battery, a steerable front wheel and a seat unit which is positioned at different locations with respect to the front and rear wheels. These components are generally mounted on some form of a frame or platform. Such a personal mobility vehicle is generally much too heavy in weight and bulky to be manipulated by the user in loading the vehicle into an automobile for transport or to move the vehicle up a flight of stairs. Some additional assistance such as an attendant or powered lift platform is thus necessary to load the personal mobility vehicle into a van or the like.

It has therefore been proposed to construct such vehicles so that they may be disassembled into several components to facilitate the transfer of such vehicles in an automobile van or in some other manner to the site of operation of the personal mobility vehicle. It was further contemplated that such personal vehicles would be capable of disassembly and assembly by patients and others who have some physical disability but are sufficiently physically active to assemble or disassemble the components of a personal vehicle. However, in many cases the disassembled components of the personal vehicle were still rather heavy and bulky for a single person, let alone a patient with some disability, to readily handle in order to place the components into an automobile trunk, for example. In order to insure that the connection and latch systems between the components of the personal vehicle were safe and rigid, these systems became rather complex and complicated to handle. When attempts were made to simplify these systems, the resulting systems were not completely reliable.

Personal mobility vehicles which can be disassembled into several components and subsequently reassembled are disclosed in U.S. Pat. Nos. 4,757,868; 4,452,327; 4,570,739; 3,912,032 and 4,750,578. However, all of these prior art vehicles have relatively complicated connecting and latching arrangements.

It is therefore the principal object of the present invention to provide a novel and improved personal mobility vehicle which can be readily disassembled into several components which can be easily handled by a single person and which can be subsequently readily reassembled.

It is another object of the present invention to provide a novel and improved frame for a personal mobility vehicle having two frame sections which can be readily disassembled and assembled.

It is a further object of the present invention to provide a novel and improved detachable connection between several frame sections which enables the frame sections to be readily assembled or disassembled with a minimum of physical effort and without special tools.

According to one aspect of the present invention, a personal mobility vehicle may comprise a front frame section having a steering column operatively connected to a steerable front wheel mounted on the forward portion thereof. A rear frame section has a motor drivingly connected to drive wheels and further includes a battery to operate the motor and a seat unit. Means are provided on the rear portion of the front frame section and on the rear frame section for detachably connecting the rear frame section within the rear portion of the front frame section such that the length of the connected front and rear frame sections is substantially the same as the length of the front frame section.

A detachable connection between the front and rear frame sections may comprise a pair of pivot cups on the rear end of the front frame section to longitudinally receive transversely extending pivot pins on the rear end of the rear frame section. The rear frame section can be then pivoted into the plane of the front frame section and detachably locked in position.

Other objects and advantages of the present invention will be apparent upon reference to the accompanying description when taken in conjunction with the following drawings, which are exemplary, wherein;

FIG. 3A is a top plan view of the front frame section of the vehicle of FIG. 1;

FIG. 3B is a top plan view of the rear frame section of the vehicle in FIG. 1;

FIG. 4 is a side elevational view showing the front and rear frame sections of FIGS. 3A and 3B assembled and the rear frame section in position to be pivoted into locking relation in the front frame section;

FIG. 5 is an end elevational view viewed in the direction of the arrow V of the front frame section of FIG. 3A with a portion of the head tube support being removed.

Proceeding next to the drawings wherein like reference symbols indicate the same parts throughout the various views a specific embodiment and modification of the present invention will be described in detail.

Figure 1:
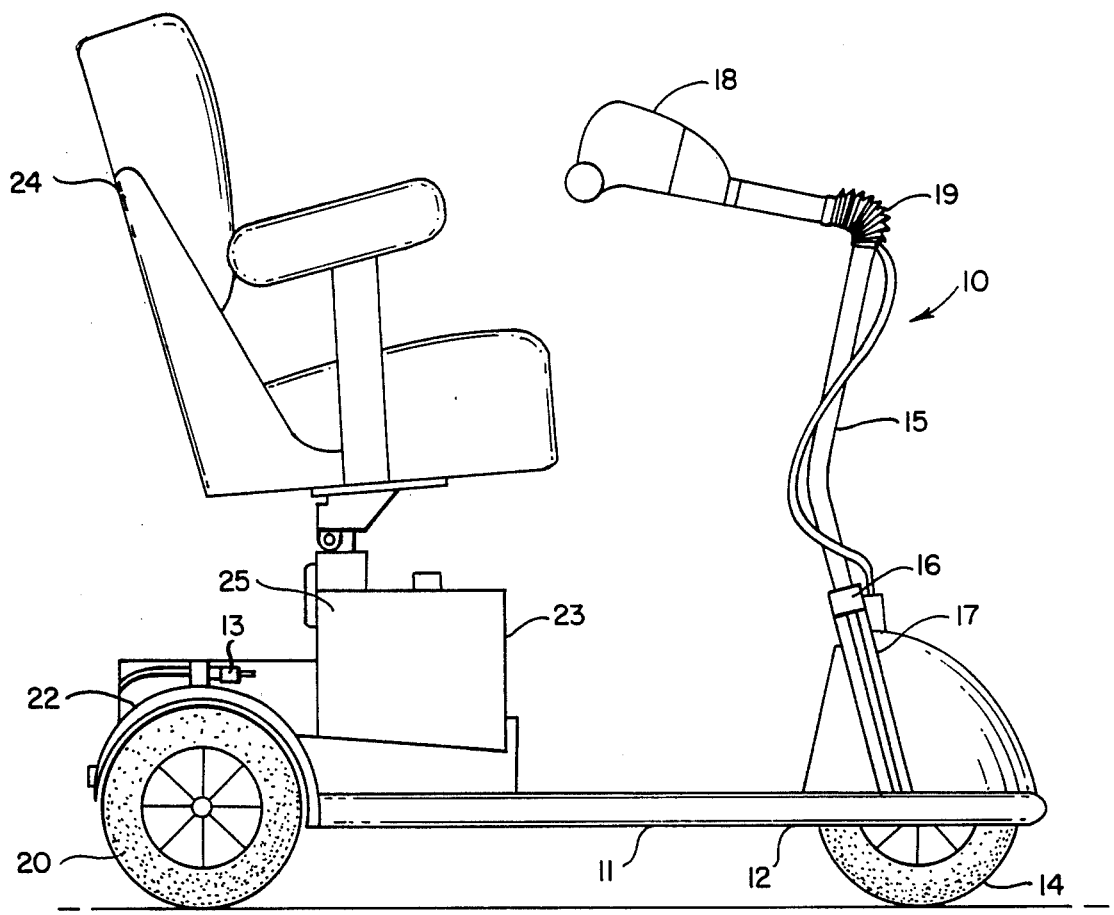
FIG. 1 is a side elevational view of a three wheel personal vehicle which incorporates the present invention.

As may be seen in FIG. 1, a personal vehicle incorporating the present invention is indicated generally at 10. This vehicle comprises a light weight aluminum frame 11 which consists of a front frame section 12 and a rear frame section 13 illustrated in greater detail in FIGS. 3A and 3B, respectively. The front frame section 12 comprises a front wheel 14 which is steerable by means of a handlebar 15 which is pivotally mounted in a head tube 16 mounted on a head tube support 17. The upper end of the handlebar 15 has a control unit 18 which may comprise a volt meter/fuel gauge, on-off key switch and dial-a-speed adjustment knob. The handlebar 15 also has an adjustable joint 19 which enables the control unit 18 to be adjusted to a desired height.

The rear frame section 13 which is shown in greater detail in FIGS. 3B and 4, comprises drive wheels 20 mounted on the end of a sealed direct drive transaxle 21 which is drivingly connected to an electric motor 22 powered by batteries 23. A pivotable seat unit 24 is mounted in a socket 25 which is upstanding from the rear frame section 13. Preferably, the rear frame section also includes a built-in battery charger which is not illustrated.

Figure 2:
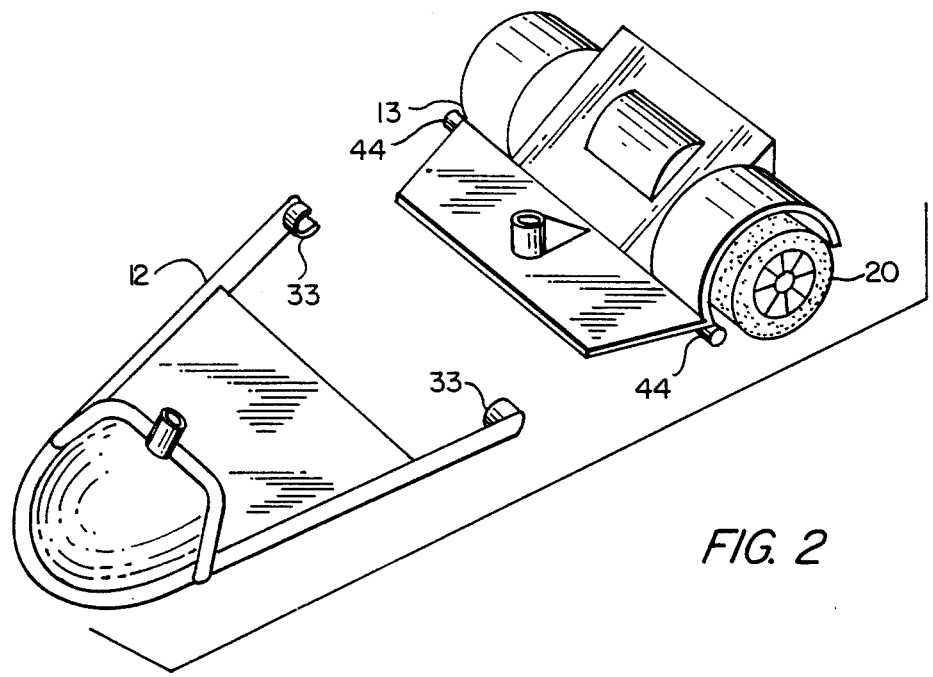
FIG. 2 is a perspective view showing the front and rear frame sections of FIG. 1 disassembled and the seat unit and steering handle removed for purposes of clarity.

The personal vehicle 10 can be disassembled into two major components comprising the front frame section 12 and the rear frame section 13 as shown in FIG. 2. The handlebar can be further removed from the front frame section and the seat unit and batteries can be disassembled from the rear frame section so that these frame sections would then appear as shown in FIG. 2. The disassembly of the vehicle is achieved by the frame construction which will now be described in detail.

The front frame section 12 comprises a U-shaped frame loop 26 with the closed end of the frame loop defining the front 27 and the frame loop having a pair of slightly diverging longitudinal members 28 and 29. A cross member 30 connects the longitudinal members 28 and 29 inwardly of the ends thereof to define a rear portion of the front frame section. The longitudinal members 28 and 29 have ends 31 and 32 respectively and secured on the ends are transversely extending pivot cups 33 which are substantially U-shaped and which open longitudinally and toward the rear of the front frame section. The frame loop 26 is preferably formed from a substantially rectangular cross section hollow aluminum tubular member. The central portion of the front frame section extending approximately between the cross member 30 and the head tube support 17 is covered by a floor pan 34 attached to the underside of the frame loop as seen in FIG. 4.

The cross member 30 is formed from a channel member which opens upwardly and has a web 35 and a flange 36 directed toward the rear of the front frame section. The flange 36 has a plurality of spaced rectangular notches 37 therein to accommodate respectively the center support members on the rear frame section in a manner to be presently described.

The web 35 of the cross member 30 has on its inner surface a plurality of upwardly extending cylindrical protuberances 38. There is a pair of opposed openings in the central portion of the flange to accommodate a locking pin 39 having a pull loop 40. The locking pin 39 is preferably of the type which has a spring biased depressable detent so as to prevent the pin from disengaging itself from the openings.

The rear frame section 13 shown in FIG. 3B comprises front and rear cross members 41 and 42 which are interconnected by a plurality of center support members 43. These members are all preferably formed of square sectioned aluminum tubing. A pair of oppositely disposed pivot pins 44 extend transversely from the ends of the rear cross member 42. These pivot pins are cylindrical and shaped to fit pivotably into the pivot cups 33.

The power axle 21 and rear wheels 20 are mounted rearwardly of the rear cross member 42 by a pair of flat leaf springs 45 whose inner ends are secured to the undersides of the outer central cross members 43 as shown.

The disassembled vehicle can be readily assembled in a matter of seconds without tools. The rear frame section 13 is stood up on its rear structure which may comprise a collapsable back basket 46 into the position as illustrated in phantom lines in FIG. 4. The front frame section is then moved longitudinally in the direction of the arrow 47 until the transversely extending pins 44 are received into the pivot cups 33. This positioning of the transverse pins into the pivot cups will align the front and rear frame sections in the correct position. The rear frame section is then pivoted downwardly in a counter clockwise direction as seen in FIG. 4 until the front cross member 41 is seated within the channel member 30. In this seated position, the central support members 43 of the rear frame section 13 will be received within the notches 37 in the channel member 35 and the protrusions 38 in the channel member 30 will be received into correspondingly positioned openings 48 formed in the underside of the front cross member 41 of the rear frame section. The locking pin 39 is then passed through corresponding openings in the front cross member 41 and in the flange of the channel member 35 to lock the frame sections securely in their proper positions. The seat unit and batteries are then replaced on the rear frame section and the handlebar on the front frame section and the vehicle is ready for operation. The above described connection between the front and rear frame sections provides a secure and rigid assembled frame which will withstand shocks and impacts, such as being driven off a curb or other high level. Since the rear frame section is detachably connected within the rear portion of the front frame section it becomes an integral part of the front frame section to form the entire assembled frame of the vehicle. The assembled vehicle thus provides limitless mobility over even the roughest terrain.

Thus it can be seen that the present invention has provided an improved personal mobility vehicle which has a simple and reliable detachable connection between its two frame sections each of which may have various lengths and which may include a special frame section to convert the three wheel personal mobility vehicle as shown in FIG. 1 into a four wheel personal vehicle. The improved detachable connection between the two frame sections enables the vehicle to be readily disassembled and assembled in a matter of seconds without the use of any tools and may actually be carried out by the user without any assistance since the components of the vehicle are relatively light in weight and are shaped to be easily handled.

The facility of this assembly of the vehicle means that the vehicle can be readily transported in an automobile to a desired destination and can then be assembled in seconds.

It will be understood that this invention is susceptible to modification in order to adapt it to different usages and conditions, and accordingly, it is desired to comprehend such modifications within this invention as may fall within the scope of the appended claims.

What is claimed is:

1. A frame for a personal vehicle comprising a front frame section having a pair of spaced longitudinal frame members extending rearwardly and having rear ends, a first cross member forwardly of the rear ends of said longitudinal frame members, a rear frame section, first means on said rear frame section extending transversely therefrom and spaced rearwardly of a forward portion thereof and second means on said front frame section coacting with said first means for detachably connecting said rear frame section within a rear portion of said front frame section extending between the rear ends of said longitudinal frame members and rearwardly of said first cross member to define said frame, at least a majority of said rear frame section being disposed forwardly of said rear ends of said longitudinal frame members such that the length of said frame is substantially the same length as the front frame section itself.

2. A frame as claimed in claim 1 wherein said detachable connecting means comprises means for pivoting said rear frame section between said rear ends of said longitudinal frame members.

3. A frame as claimed in claim 1 and further comprising a substantially U-shaped pivot cup on each of said rear ends of said frame members and opening rearwardly of said front frame section, and a pair of tranvsverse pivot pins at the rear end of said rear frame section and pivotally received within said pivot cups, said rear frame section comprises a second cross member at said rear end and said pivot pins extend outwardly from opposite ends of said second cross member.

4. A frame for a personal vehicle comprising a front frame section having a rear portion, said front frame section having a pair of spaced longitudinal frame members extending rearwardly and having rear ends, a first cross member forwardly of the rear ends of said longitudinal frame members to define said rear portion, a rear frame section, first means on said rear frame section and second means on said front frame section coacting with said first means for detachably connecting said rear frame section within said rear portion of said front frame section to define said frame, the length of said frame being substantially the same length as the front frame section itself, means on said first cross member for positioning said rear frame section in connected relation with said rear portion of said front frame section, said rear frame section comprises a further cross member defining a forward edge thereof, and means for locking said further cross member to said first cross member when said rear and front frame sections are in connected relation.

5. A frame as claimed in claim 4 wherein said first cross member has a channel shape which opens upwardly to receive said further cross member of said rear frame section.

6. A frame as claimed in claim 5 wherein said rear frame section comprises a second cross member at a rear end thereof and pivot pins extend outwardly from the sides of said second cross member, said rear frame section further comprising a plurality of center support members extending longitudinally between said second and a further cross members, there being a plurality of notches in a flange of said channel shape first cross member corresponding to the plurality of said center support members and receiving said center support members when said front and rear frame sections are in connected relation.

7. A frame as claimed in claim 6 wherein there is a plurality of upstanding protuberances in a web of said channel shape first cross member, said further cross member of said rear frame section having an underside with a corresponding plurality of openings therein to register with said protuberances so as to position said rear frame section with respect to said front frame section.

8. A frame as claimed in claim 7 and further comprising means for locking said rear frame section in position on said first cross member of said front frame section.

9. A frame for a personal vehicle comprising a front frame section having a first rear end, a rear frame section having a front end, means on said first rear end for longitudinally receiving a transversely projecting portion of said rear frame section spaced rearwardly of said front end thereof, and means on said front frame section forwardly of said first rear end for detachably connecting said rear frame section to said front frame section when said transversely projecting portion has been received in said receiving means such that a majority of said rear frame section is disposed within an area defined on said front frame section extending forwardly from said first rear end.

10. A frame as claimed in claim 9 wherein said rear frame section has a second front end, said detachable connecting means comprises means for defining an upwardly opening channel into which at least a portion of said second front end is pivoted after said second rear end portion is received within said longitudinal receiving means.

11. A personal vehicle comprising a front frame section having a forward portion and a first rear end, there being a steerable front wheel on said forward portion and a steering column operatively connected to said steerable front wheel, a rear frame section having a second rear end and having drive wheels and a motor drivingly connected to said drive wheels, said rear frame section having further mounted thereon a seat unit and a battery selectively connectable to operate said motor, means on said first rear end for longitudinally receiving a portion of said second rear end, and means on said front frame section forwardly of said first rear end for detachably connecting said rear frame section to said front frame section when said second rear end portion has been received in said receiving means such that said rear frame section is disposed within a portion of said front frame section extending forwardly from said first rear end.

12. A personal vehicle as claimed in claim 11 wherein said detachable connecting means comprises means for pivoting said rear frame section on the rear portion of said front frame section and for locking said rear frame section within the rear portion of said front frame section.

13. In a personal mobility vehicle, a detachable connection between a front frame section having a steerable wheel and a rear frame section having drive wheels and a seat unit comprising a pair of transversely spaced longitudinally opening pivot cups on a rear end of said front frame section, a pair of oppositely extending transverse pivot pins on a rear end of said rear frame section and disposed to be received within said pivot cups, means on said front frame section forwardly said rear end thereof for defining an upwardly opening channel into which at least a portion of said rear frame section can be pivoted when said pivot pins have been received within said pivot cups, and means for detachably locking said rear frame section in said channel whereby said rear frame section can be selectively disassembled from said front frame section.

14. In a personal mobility vehicle a detachable connection as claimed in claim 13 wherein said upwardly opening channel comprises a transverse channel member, said rear frame section comprising a forward cross member received within said channel member.

15. In a personal mobility vehicle a detachable connection as claimed in claim 13 wherein said pivot cups open rearwardly.

* * * * *